(12) United States Patent
Jones et al.

(10) Patent No.: US 8,204,178 B1
(45) Date of Patent: Jun. 19, 2012

(54) METHOD TO PREVENT TTY/TDD PROBING AND UNWANTED TTY/TDD TONE GENERATION ON VOICE GATEWAYS

(75) Inventors: Paul Edwin Jones, Apex, NC (US); Steven John White, Woodinville, WA (US)

(73) Assignee: Cisco Technology, Inc., San Jose, CA (US)

( * ) Notice: Subject to any disclaimer, the term of this patent is extended or adjusted under 35 U.S.C. 154(b) by 1490 days.

(21) Appl. No.: 11/689,387

(22) Filed: Mar. 21, 2007

(51) Int. Cl.
*H04M 11/00* (2006.01)

(52) U.S. Cl. ............ 379/52; 379/93.01; 379/93.31

(58) Field of Classification Search ............ 379/52, 379/93.01, 88.13, 93.31, 93.33, 93.14, 93.17, 379/229; 370/261, 352, 401, 466, 252, 342, 370/400, 403, 404, 449, 473, 270; 709/227, 709/228, 229; 455/450, 458, 519, 466
See application file for complete search history.

(56) References Cited

U.S. PATENT DOCUMENTS

| 7,792,143 B1 * | 9/2010 | Jones et al. ............ 370/466 |
| 2008/0123670 A1 * | 5/2008 | Mundra et al. ............ 370/401 |

OTHER PUBLICATIONS

ITU-T Recomendation V.151 May 2006.*
Hellstrom, G. and Jones, P., "RTP Payload for Text Conversation," The Internet Society, Network Working Group, RFC No. 4103, Jun. 2005.

* cited by examiner

*Primary Examiner* — Melur Ramakrishnaiah
(74) *Attorney, Agent, or Firm* — Baker Botts L.L.P.

(57) ABSTRACT

A method to prevent TTY/TDD (teletypewriter/telecommunications device for the deal) probing and unwanted TTY/TDD tone generation on voice gateways comprises detecting a PSTN textphone in a call path, if any; and providing visual clues to an end user, thereby avoiding generation of unwanted text by the end user. The visual clues may be in the form of a dialog box on a computer, warning messages on a phone, and/or the like.

18 Claims, 3 Drawing Sheets

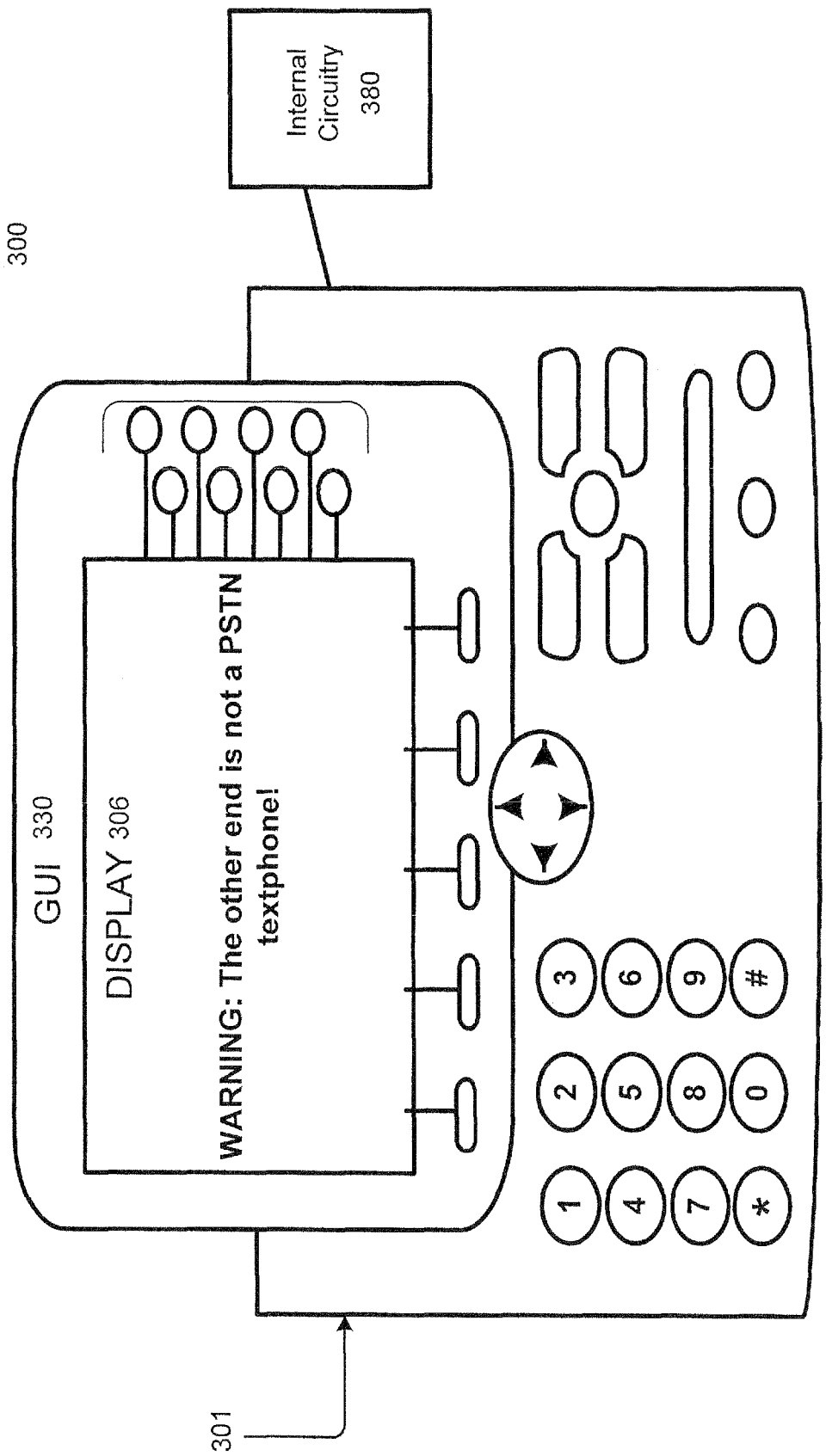

METHOD TO PREVENT TTY/TDD PROBING AND UNWANTED TTY/TDD TONE GENERATION ON VOICE GATEWAYS

TECHNICAL FIELD

The present disclosure relates generally to communications, and more particularly to a method, system and device for preventing TTY/TDD (teletypewriter/telecommunications device for the deaf) probing and unwanted TTY/TDD tone generation on voice gateways.

BACKGROUND

Most phone devices today do not have both audio and text capability, but that will soon change. As there are more Internet Protocol (IP) devices available with text capability, users will grow accustomed to sending text as part of a voice conversation (e.g., Instant Messaging used while on the phone). When real-time text is integrated as part of a phone conversation between two end users, one of the end users may send text messages over the IP network to the other end user who is on the Public Switched Telephone Network (PSTN), an analog terminal adapter, and/or other device with traditional phones connected and is not capable of receiving and/or sending text. The text messages may be translated into audible tones which are played into the ear of the end user who does not have text capability much more frequently. For example, assume a PSTN caller calls another party to engage in a phone conversation, further assume that the called party is using a text-capable IP softphone. While talking, the IP softphone user says: "Here, let me send you the address". He copies and pastes an address into the softphone device. In such a case, the text message may result in unwanted audio tones generated and played out to the PSTN user on the other end.

The ITU-T approved Recommendation V.151, which defines how to reliably transport text generated by a PSTN textphone (TTY/TDD) device over IP networks. Signals received by a gateway are extracted from the media stream from the PSTN and converted into text characters (T.140) that are then inserted into the media path. The primary application for this capability is trunking PSTN textphone calls over IP networks. However, when IP voice devices (e.g., a softphone or IP phone) are engaged in a text call, there is no indicator to alert the user of the IP devices to the fact that the remote party may be connected to the PSTN and is not capable of sending/receiving text. In such a situation, the user of the IP text-enabled device (e.g., Cisco's Unified Client or IP phone) may enter text, resulting in unwanted audio tones generated and played out to the PSTN user.

Therefore, it is beneficial to provide various clues to alert users of IP voice devices that a remote user may be connected to the PSTN and is not capable of sending/receiving text, thus avoiding transmission by the gateway of unwanted TTY (e.g., Baudot) tones out onto the PSTN to the user.

DESCRIPTION OF EXAMPLE EMBODIMENTS

Overview

A method to prevent TTY/TDD (teletypewriter/telecommunications device for the deaf) probing and unwanted TTY/TDD tone generation on voice gateways comprises detecting a PSTN textphone in a call path, if any; and providing visual clues to an end user, thereby avoiding generation of unwanted text by the end user. The visual clues may be in the form of a dialog box on a computer, warning messages on a phone, or the like.

A system for preventing TTY/TDD (teletypewriter/telecommunications device for the deaf) probing and unwanted TTY/TDD tone generation on voice gateways includes a voice gateway coupled to a communication network, a first end device coupled to the voice gateway, and a second end device coupled to the communication network. The second device includes means for detecting a PSTN textphone in a call path, if any; and providing visual clues to an end user, thereby avoiding generation of unwanted text by the end user.

BRIEF DESCRIPTION OF THE DRAWINGS

The foregoing and other objects, advantages and features will become more readily apparent by reference to the following detailed descriptions in conjunction with the accompanying drawings.

FIG. 3 is an example voice device implementing the method in FIG. 1 for preventing TTY/TDD probing and unwanted TTY/TDD tone generation on voice gateways.

DETAILED DESCRIPTIONS

Figure 1:
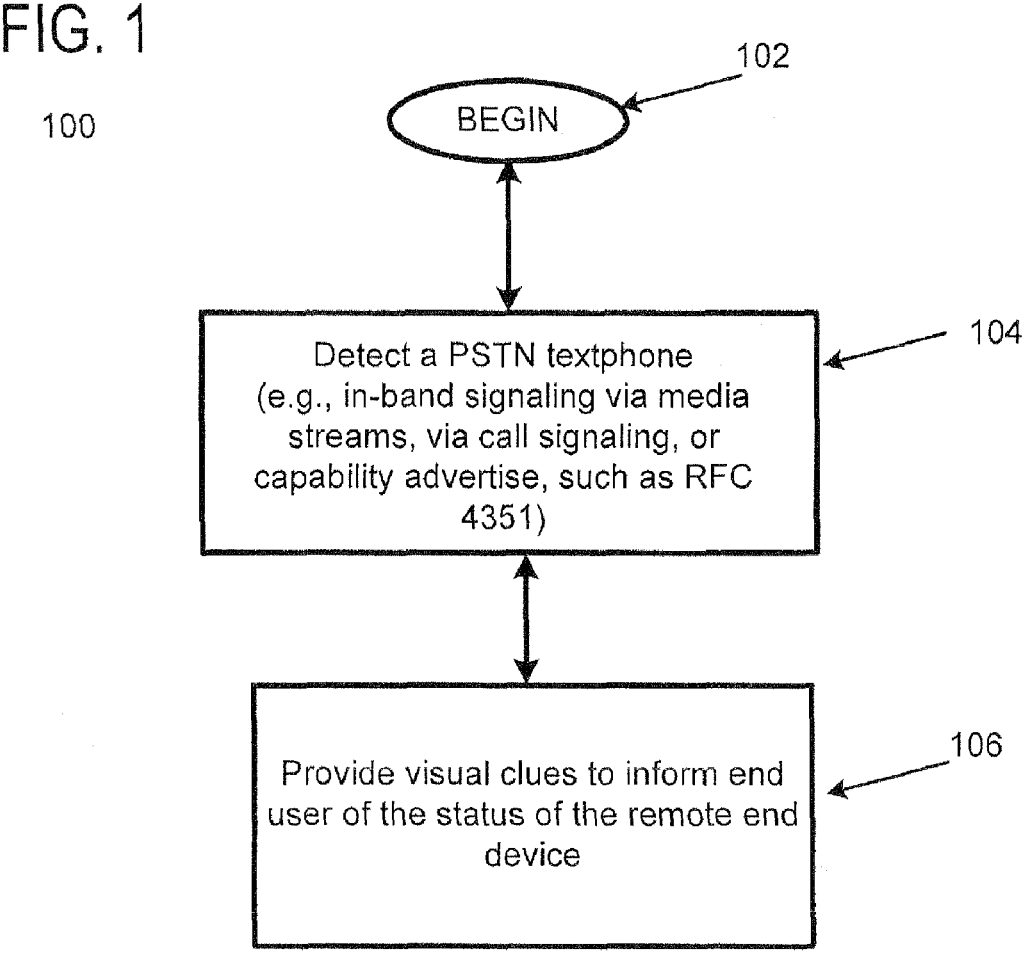
FIG. 1 is a flow chart illustrating an example method for preventing TTY/TDD probing and unwanted TTY/TDD tone generation on voice gateways.
Figure 2:
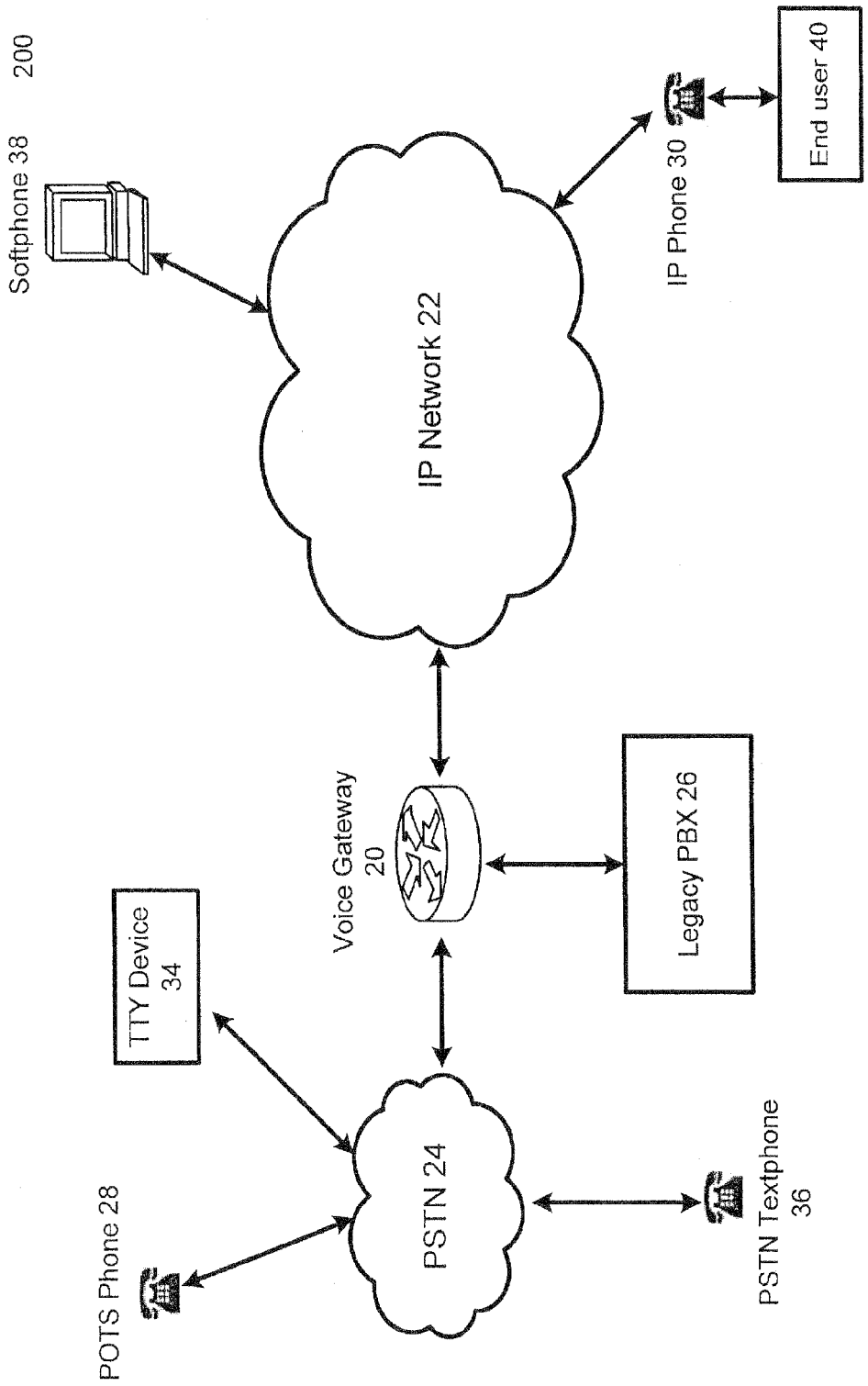
FIG. 2 is a schematic block diagram illustrating an example system for preventing TTY/TDD probing and unwanted TTY/TDD tone generation on voice gateways according to the method in FIG. 1.

FIG. 1 is a flow chart illustrating an example method 100 for preventing TTY/TDD probing and unwanted TTY/TDD tone generation on voice gateways, such as voice gateway 20 shown in FIG. 2. For the following discussions, we assume there is a communication path established between two end devices, such as IP phone 30 and PSTN textphone 36, as shown in FIG. 2.

Method 100 begins with step 102. Step 104 detects whether a PSTN textphone (TTY/TDD) may be in the call path. There are several alternative means to intelligently decide whether a remote end device may be a PSTN textphone, thus capable of receiving and/or sending text. One example is to detect whether an opposite device (e.g., voice gateway 20 in FIG. 2) is capable of using ITU-T Recommendation V.151 or RFC 4103 for transmission of text. If V.151 is used to transmit text, this indicates that the remote end device is most likely a PSTN textphone.

Another means to determine the possible presence of a PSTN textphone is to signal the fact that a PSTN textphone may be present through call control signaling (e.g., Session Initiation Protocol or SIP). There are several ways to signal this fact, including placing some type of signaling element to indicate that a) a PSTN gateway is in the call path; b) a PSTN textphone is known to be in the call path; c) a PSTN textphone is not in the call path; d) the gateway is capable of transmitting text (for example, via RFC 4103); or e) voice and text operation cannot occur simultaneously.

Yet another means to signal the possible presence of a PSTN textphone is to transmit indicators through "signaling" in the media stream. Such in-band signaling may be State Signaling Event (SSE), Cisco's proprietary Name Signaling Event (NSE), and/or IETF RFC 2833.

If text is received at a local end device (e.g., IP phone 30), this would also serve as confirmation that the remote end device is text-capable. Once the local end device knows that a text-capable PSTN gateway is in the call path or that the remote device is text-capable, it can then decide whether or not to provide a warning to the local end user.

At step 106, various visual clues are provided to inform the end user of the status of the remote end device. For example, visual clues may indicate that the remote device is not a PSTN textphone, or that the PSTN gateway is in the call path but it is unknown whether the remote end device is a PSTN textphone. Thus, the end user is warned to avoid generation of unwanted text on the IP phone. On the other hand, if the remote device is a PSTN textphone, no visual clue is provided to the end user since the end user may send text safely. The visual clues may be in the form of a dialog box on a computer, warning messages on a phone, or the like. The end user may then decide whether to send any text message out onto the PSTN side in response to these visual clues.

FIG. 2 is a schematic block diagram illustrating an example system 200 for preventing TTY/TDD probing and unwanted TTY/TDD tone generation on voice gateways according to the method in FIG. 1.

Gateway 20 is any digital device allowing voice data to be transported across a network, such as the IP network 22. Gateway 20 is responsible for call origination, call detection, and encoder-decoder (CODEC) functions, including at least analog-to-digital conversion and voice packet creation. Specifically, Gateway 20 includes a trunk interface that connects to traditional telephone trunks or analog and digital devices. The trunks are connected to Public Switched Telephone Network (PSTN) 24, legacy Private Branch Exchange (PBX) system 26, Plain Old Telephone Service (POTS) telephone 28, and PSTN textphone 36. On the other end of IP network 22 are IP phone 30 and softphone 38 (a "softphone" is an application that runs on a computer), which are all connected directly onto the IP network, as shown in FIG. 2. A caller communicates with another caller located on the remote end of a communication channel via IP network 22 and voice gateway 20 using any of the various technologies, such as IP phone 30, softphone 38, PSTN textphone 36, and/or POTS phone 28.

Gateway 20 may send explicit signals to IP phone 30 (such as in-band signaling via media streams, or via call signaling) to indicate the status of the remote end device. Alternatively, gateway 20 may implicitly indicate the status to IP phone 30 using capability information, such as support for V.151. Gateway 20 may indicate to IP phone 30 that a) a PSTN gateway is in the call path, but it is unknown whether there is a PSTN textphone in the call path; b) a PSTN textphone is not in the call path; or c) a PSTN textphone is known to be in the call path.

Based on these indicators, IP phone 30 is able to detect the presence of a PSTN textphone on the other end. IP phone 30 may then provide various visual clues to inform end user 40 of the status of the remote end device. For example, visual clues may indicate that the remote device (e.g., POTS phone 28) is not text capable, or that the PSTN gateway is in the call path but the remote end device text capability is unknown, so that end user 40 is warned to avoid generation of unwanted text on the IP phone. On the other hand, if the remote device is a PSTN textphone (e.g., PSTN textphone 36), no visual clue is provided to end user 40. In this case, end user 40 may send text safely. The visual clues may be in the form of a dialog box on a computer, warning messages on a phone, or the like. End user 40 may then decide whether to send any text message out onto the PSTN side in response to the visual clues.

By providing a visual clue to the end user and then later updating it when PSTN textphone signals are detected on the PSTN side (e.g., in-band signaling via the media streams, out-band signaling or capability information, such as support for V.151), the system and method described above can avoid the situation of unwanted audible tones which would be perceived as uncomfortable 'noise' to the PSTN user.

FIG. 3 depicts a communication device 300 in an example implementation for an IP phone, such as Cisco's 7960 phone. It should be appreciated that communication device 300 can be of a variety of implementations capable of sending and receiving text, i.e., a digital cellular telephone, an IP phone (e.g., the IP phone 30 in FIG. 2), a portable computer such as a laptop, a personal digital assistant, other device, apparatus, appliances, and the like.

Referring to FIG. 3, communication device 300 comprises a sturdy case 301, e.g., of a tough plastic or comparably suitable composition. Case 301 provides structural integrity for other components in device 300. Functionality of device 300 is provided with circuitry 380, which is internal to device 300 and isolated from the environment in which the device is deployed from contamination or user contact.

Circuitry 380 includes components such as processors, memory, signal processing, transceiving, modulating and demodulating, multiplexing and demultiplexing, control, amplifying, power management, discrete, IC, and other components, which can be coupled with a bus and other conductors, signal, data, etc. flow paths, power devices such as battery and other components. Components of circuitry of 380 and their functional interrelations are well known in the communicating, computing and related arts. An example communication device is an IP phone with the appropriate software and firmware, implementing functionality to carry out the above described method, such as detecting a PSTN textphone and providing visual clues to an end user. For example, visual clues may be delivered to the end user to indicate that the remote device is not text capable, or that the PSTN gateway is in the call path but the remote end device text capability is unknown, so that the end user of the IP phone is warned to avoid generation of unwanted text on the phone. On the other hand, if the remote device is a PSTN textphone, no visual clue is provided to the end user of the IP phone. In this case, the end user may send text safely. Circuitry 380 can also be configured to allow device 300 to provide graphical information on display component 306. Upon receiving the visual clues on display component 306, an end user determines whether to send any text message out onto the PSTN side in response to these visual clues.

Finally, those of skill in the art will appreciate that the method and system described and illustrated herein may be implemented in software, firmware or hardware, or any suitable combination thereof. Preferably, the method and system are implemented in software, for purposes of low cost and flexibility. Those of skill in the art will appreciate that the method and system may be implemented in logic encoded in one or more tangible media for execution in a machine. Alternative embodiments are contemplated and are within the spirit and scope of the following claims.

The invention claimed is:

1. A method to prevent TTY/TDD (teletypewriter/telecommunications device for the deaf) probing and unwanted TTY/TDD tone generation on voice gateways, comprising:
   detecting a PSTN textphone in a call path by detecting a first end device transmitting text using ITU-T Recommendation V.151 or IETF RFC 4103;
   providing a visual clue to an end user, thereby avoiding generation of unwanted text by the end user.

2. The method of claim 1, in which detecting a PSTN textphone in a call path comprises placing a signaling element into a signaling protocol, the signaling element indicating one or more of the following:
- a PSTN gateway is in the call path;
- a PSTN textphone is not in the call path;
- a PSTN textphone is known to be in the call path;
- a PSTN gateway is capable of transmitting text; or
- voice and text operation cannot occur simultaneously.

3. The method of claim 1, in which detecting a PSTN textphone in a call path comprises detecting a signal through in-band signaling according to at least one of the following:
- State Signaling Event (SSE);
- Name Signaling Event (NSE); or
- RFC 2833.

4. The method of claim 1, in which providing a visual clue to an end user in the call path comprises providing the visual clue in the form of one or more of a dialog box on a computer, a warning message on a phone.

5. The method of claim 1, in which providing a visual clue to an end user comprises providing one of the following clues:
- a PSTN textphone is not in the call path; or
- a PSTN gateway is in the call path, but it is unknown whether a PSTN textphone is in the call path.

6. A system for preventing TTY/TDD (teletypewriter/telecommunications device for the deaf) probing and unwanted TTY/TDD tone generation on voice gateways, comprising:
- a voice gateway coupled to a communication network;
- a first end device coupled to the voice gateway;
- a second end device coupled to the communication network, the second device including:
  - means for detecting a PSTN textphone in a call path by detecting a first end device transmitting text using ITU-T Recommendation V.151 or IETF RFC 4103; and
  - means for providing a visual clue to an end user, thereby avoiding generation of unwanted text by the end user.

7. The system of claim 6, in which the visual clue indicates one of the following:
- a PSTN textphone is not in the call path; or
- a PSTN gateway is in the call path, but it is unknown whether a PSTN textphone is in the call path.

8. The system of claim 6, in which the second end device is a softphone or an IP phone.

9. The system of claim 6, in which the first end device is a PSTN textphone.

10. The system of claim 6, in which the first end device is a telephone without text capability.

11. The system of claim 6, in which the voice gateway is operable to convey information to the second end device using in-band signaling via media streams or via call signaling, the information indicating one of the following:
- a PSTN gateway is in the call path, but it is unknown whether a PSTN textphone is in the call path;
- a PSTN textphone is not in the call path; or
- a PSTN textphone is known to be in the call path.

12. A communicating device for preventing TTY/TDD (teletypewriter/telecommunications device for the deaf) probing and unwanted TTY/TDD tone generation on voice gateways, comprising:
- means for detecting a PSTN textphone in a call path by detecting a first end device transmitting text using ITU-T Recommendation V.151 or IETF RFC 4103; and
- means for providing a visual clue to an end user, thereby avoiding generation of unwanted text by the end user.

13. The communicating device of claim 12, in which the visual clue indicates one of the following:
- a PSTN textphone is not in the call path; or
- a PSTN gateway is in the call path, but it is unknown whether a PSTN textphone is in the call path.

14. The communicating device of claim 12, in which the communicating device further comprises a digital cellular telephone, an IP phone, a portable computer, or a personal digital assistant.

15. Logic encoded in one or more non-transitory tangible media for execution in a machine and when executed operable to:
- detect a PSTN textphone in a call path by detecting a first end device transmitting text using ITU-T Recommendation V.151 or IETF RFC 4103; and
- provide a visual clue to an end user, thereby avoiding generation of unwanted text by the end user.

16. The logic of claim 15, in which detect a PSTN textphone in a call path comprises placing a signaling element into a signaling protocol, the signaling element indicating one or more of the following:
- a PSTN gateway is in the call path;
- a PSTN textphone is not in the call path;
- a PSTN textphone is known to be in the call path; or
- voice and text operation cannot occur simultaneously.

17. The logic of claim 15, in which detect a PSTN textphone in a call path comprises detecting a signal via in-band signaling according to at least one of the following:
- State Signaling Event (SSE);
- Name Signaling Event (NSE); and
- RFC 2833.

18. The logic of claim 15, in which provide visual clues to an end user comprises providing one of the following clues:
- a PSTN textphone is not in the call path; or
- a PSTN gateway is in the call path, but it is unknown whether a PSTN textphone is in the call path.

* * * * *